Aug. 25, 1936.　　　H. G. ERICKSON　　　2,052,455
CHECK ROW PLANTER
Filed July 16, 1935　　　2 Sheets-Sheet 1
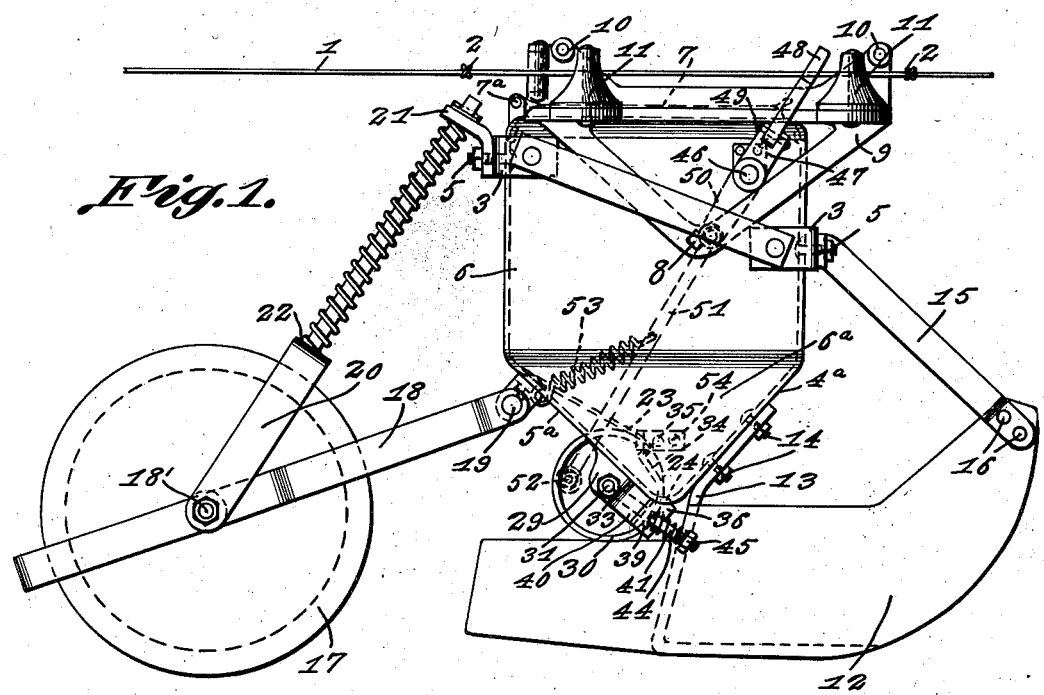
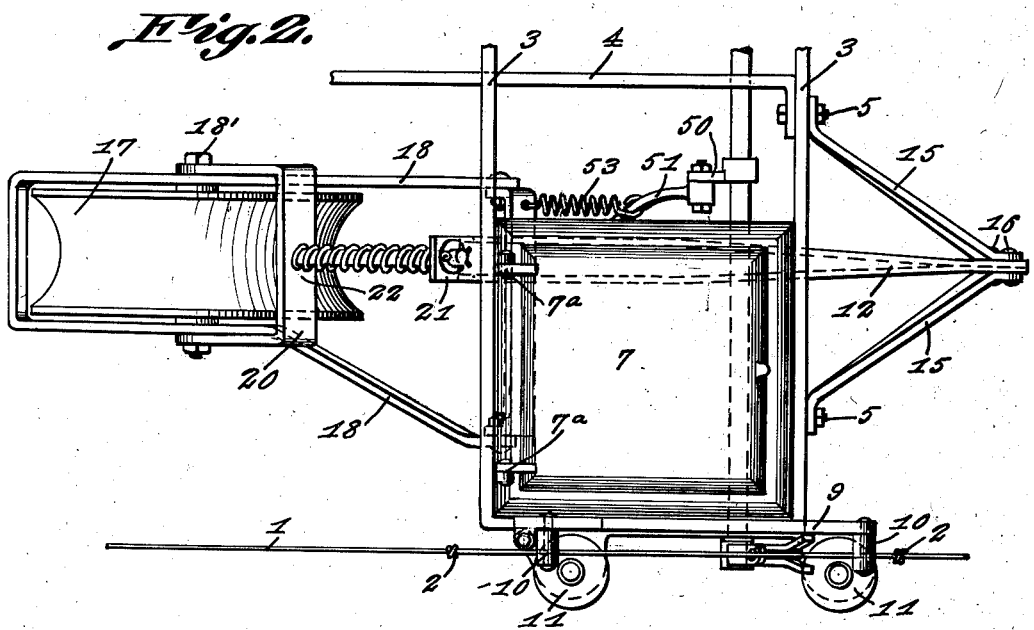
Henrick G. Erickson, INVENTOR
BY Victor J. Evans & Co.
ATTORNEY Aug. 25, 1936.  H. G. ERICKSON  2,052,455
CHECK ROW PLANTER
Filed July 16, 1935  2 Sheets-Sheet 2
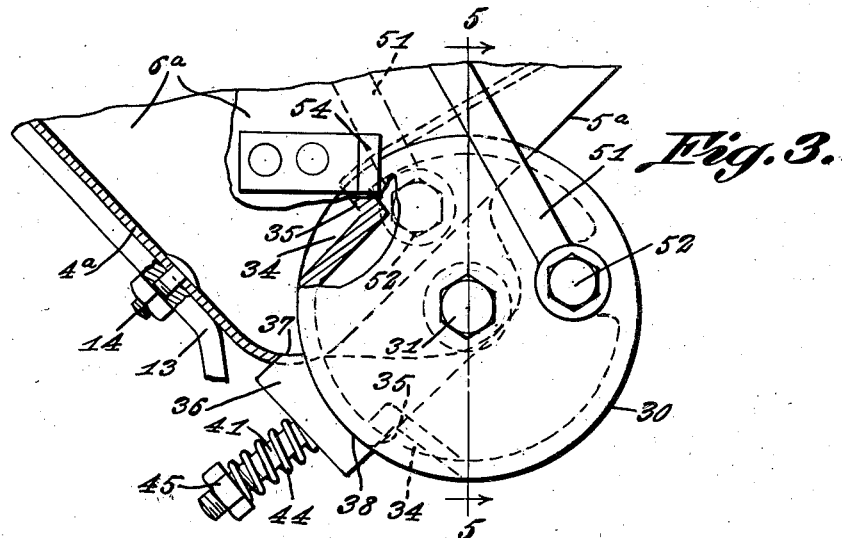
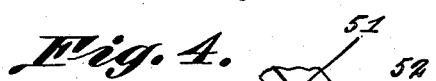
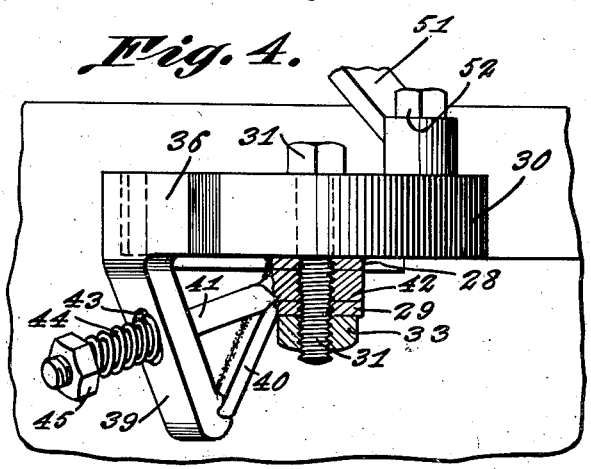
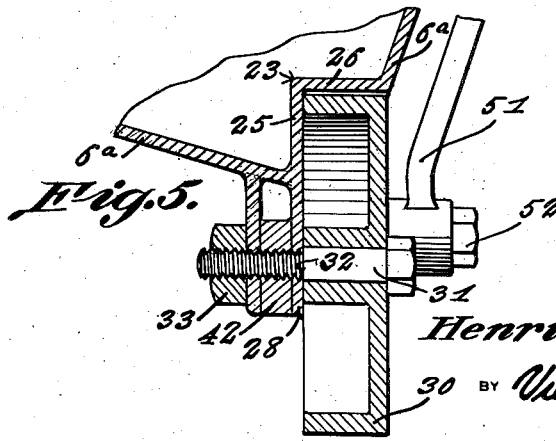
Henrick G. Erickson
INVENTOR
BY Victor J. Evans & Co.
ATTORNEY Patented Aug. 25, 1936

2,052,455

UNITED STATES PATENT OFFICE 2,052,455

CHECK ROW PLANTER

Hendrick G. Erickson, Clear Lake, Iowa

Application July 16, 1935, Serial No. 31,644

1 Claim. (Cl. 221—136)

My invention relates to planters of the so-called check row type for planting corn, beans, sugar beets and other seed planted in hills.

The invention is designed, primarily, to provide an improved seed dropping mechanism for check row planters operative under control of the usual check row wire to discharge seed into a furrow at regular intervals, and in uniform loads, without scattering the seed, and which is adapted for incorporation with planting machines of standard construction, to supplant the seed dropping mechanism thereof, without necessitating reorganizaton of such machines.

Another object is to equip a check row planter with seed dropping mechanism, operative to eject seed from a hopper in a downwardly and rearwardly inclined direction to compensate for forward travel of the planter past the location in which the seed is to be planted during the passage of the seed from the dropping mechanism into the furrow.

Other and subordinate objects are also comprehended by my invention as will presently appear when the following description and claim are read with reference to the accompanying drawings.

In said drawings:

Figure 1 is a view in side elevation of seed dropping mechanism constructed in accordance with my invention and applied to a portion of the frame of a check row planting machine.

Figure 2 is a view in top plan.

Figure 3 is a fragmentary view in vertical transverse section, taken on the line 3—3 of Figure 2 looking in the direction indicated by the arrows, and drawn to an enlarged scale.

Figure 4 is fragmentary view in bottom plan, parts showing in section, and

Figure 5 is a view in vertical transverse section taken on the line 5—5 of Figure 3 looking in the direction indicated by the arrows.

In the drawings, wherein there has been illustrated a preferred embodiment of my invention, the numeral 1 designates the usual check row wire knotted, as at 2, at intervals corresponding to the distance between the hills of seed to be planted, 3 designates spaced apart transverse frame bars of a planting machine of the usual wheeled type and 4 one of the longitudinal frame bars of said machine. Secured between the outer ends of the bars 3, as by bolts 5, is a seed box 6, for containing the seed, and having a hopper bottom formed by downwardly converging front, rear, and side walls 4a, 5a, and 6a, respectively. A cover 7 is hinged to the box 6 as at 7a.

Bolted to the outer side of the seed box 6, as at 8, is the usual wire follower or guide 9 having thereon horizontal and vertical rollers 10 and 11, respectively, between which the check wire 2 extends, and for a purpose well understood and not requiring explanation herein. The usual planter shoe 12 is secured beneath the box 6 by a bracket arm 13 on said shoe bolted to said box as at 14 and by brace rods 15 secured to said box, by the bolts 5, and to the front end of said shoe as at 16.

A concave covering wheel 17 is mounted in the rear of the box 6, in the vertical plane of the shoe 12, by means of a yoke 18 in which said wheel is rotatably mounted on a spindle 18' and which is pivoted as at 19 to the box 6 for vertical movement. The wheel 17 is yieldingly urged downwardly by means of a fork member 20 having its opposite ends connected to said spindle 18' and slidably in a fixed lug 21, respectively, and a compression spring interposed between said lug and a shoulder 22 on said fork member.

The rear wall 5a of the hopper bottom adjacent the inner side of said bottom is formed with an inwardly offset portion 23, opening into said seed box 6 to provide a discharge aperture 24 therein and comprising a vertical wall 25 arising from the bottom of the hopper and a lateral ledge 26. Depending from said wall 5a and forming a continuation of the wall 25 is a flange 28 and laterally spaced therefrom is a second similar flange 29 also depending from said wall 5a.

A wheel-like seed dropping element 30 is mounted beneath the offset portion 23, in the plane of the shoe 12, for oscillating movement and by a horizontal headed stud 31 threaded through the flanges 28 and 29 and secured thereto by a shoulder 32 on said stud engaging the flange 28 and a nut 33 on said stud bearing against the flange 29.

The seed dropping element is of the proper size to project into said offset portion 23 whereby it extends peripherally into the discharge aperture 24 in the seed box 6. A loading pocket 34 is formed in the periphery of said element 30 of V-shape form longitudinally, and having a radial rear wall 35. The seed dropping element 30 is oscillated by means presently described to load the pocket 34 with seed from the box 6 to eject the load downwardly and rearwardly of the latter.

To prevent the seed dropping element from becoming jammed by packed seed, or foreign matter, in the box 6 the following devices are provided. The rear edge of the discharge aperture 24 is slightly spaced from the periphery of the seed dropping element 30. A guard shoe 36 is mounted below the discharge opening 24, said shoe having an upper edge 37 designed to close the space between said element 30 and the rear edge of the opening 24 and an arcuate face 38 designed to bear against the periphery of said element. The guard shoe 36 is yieldingly mounted for movement radially and downwardly of said element 30 by means of a laterally projecting arm 39 thereon mounted at its outer end to fulcrum on the outer end of an arm 40 projecting angularly from the flange 29. A bolt 41, forming an angular extension of a nut 42 interposed on the stud 31 between the flanges 28 and 29, extends through an aperture 43 in the arm 39. A tension spring 44 interposed between the arm 39 and a nut 45 on the bolt 41 urges the guard shoe towards said element 30 and into a position to close the discharge opening 24. Preferably the nut 42, after proper positioning, is welded to the flanges 28 and 29 to provide a rigid support for the guard shoe 36. In the event that packed seed in the hopper or any foreign matter blocks movement of the seed dropping element 30, the guard shoe 36 will give to open the discharge aperture 24 and by so doing permit the packed seed or said matter to be ejected from the seed box. Normally, as will be clear, said shoe functions to clean the periphery of said element 30 and to close the pocket 34 after the latter leaves the seed box 6 until said pocket reaches substantially the vertical center of said element. The seed dropping element 30 is oscillated by the following means.

A rock check shaft 46 is suitably journaled in the walls of the seed box 6 with its outer end extending beneath the check row wire 1. The shaft 46 is rocked in a counterclockwise direction by means of a crank arm 47 fast on said extended end thereof and a bifurcated tappet arm 48 pivoted on said crank arm, as at 49, for movement into and out of a position to straddle the check row wire 1. Fast on the shaft 46 is a second crank arm 50 operatively connected to the seed dropping element 30 by a rod 51 and pivot pin 52. The arrangement of the parts 47, 48, 50 and 52 is such that, upon forward movement of the planting machine the seed dropping element 30 is rotated clock-wise substantially 90 degrees during which movement the loading pocket 34 is moved from a position above the bottom of the seed box 6 to a position slightly in the rear of the lower edge of the guard shoe 36. A tension spring 53 having its opposite ends connected to the rod 51 and to a fixed part, respectively, returns the parts 47, 48, 50, 52 and 30 to starting position as determined by a stop element 54 secured to the seed box 6 to be engaged by said pin 52.

It will be noted that because of the direction of rotation of the element 30 and the discharge position of the loading pocket 34 the seed is ejected obliquely and rearwardly against the ground. The angle at which it is ejected is such as to compensate for travel of the pocket 34, in its discharge position, past the planting location during the passage of the seed to the ground.

The foregoing constitutes a detailed description of a preferred embodiment of my invention and it is believed that its operation and advantages will be clear therefrom.

It is to be understood, however, that the present disclosure is illustrative of the details of my invention rather than restrictive and that right is herein reserved to modifications of the precise details described within the scope of the appended claim.

What I claim is:

In a check row corn planter including a check shaft and a seed container having a hopper bottom provided with a discharge aperture in one wall thereof, a wheel-like seed measuring and dropping element having a peripheral pocket therein and journaled on said hopper with its periphery projecting into the latter through said aperture and spaced from the opposite edge of said aperture, a shoe member for closing said space and scraping the periphery of said element, means for yieldingly supporting said shoe member in closing and scraping position and comprising an upright arm fixed on the journal of said element and inclining laterally of the element, a laterally extending arm on said shoe fulcrumed on the fixed arm, an eye bolt on the journal of said element passing through the laterally extending arm, a spring on said bolt urging the last named arm toward said element, and means for oscillating said element under control of said check shaft to move said pocket into and out of the seed container.

HENRICK G. ERICKSON.